Jan. 9, 1968  E. E. HARNISH  3,362,452
AIRCRAFT TIRE INFLATION-DEFLATION SYSTEM
Filed July 27, 1966
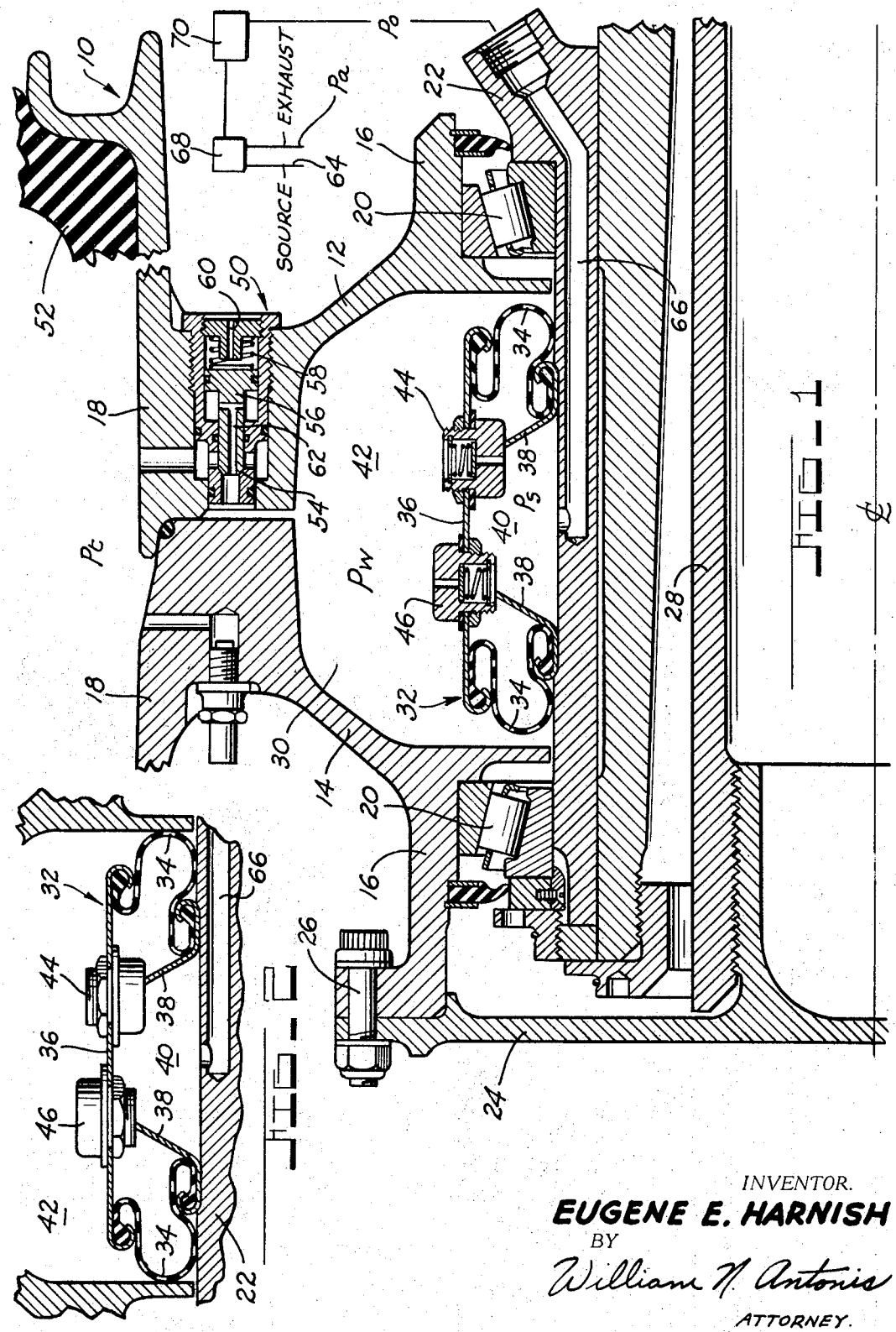
INVENTOR.
EUGENE E. HARNISH
BY
*William N. Antonis*
ATTORNEY.

United States Patent Office 3,362,452
Patented Jan. 9, 1968

3,362,452
AIRCRAFT TIRE INFLATION-DEFLATION SYSTEM
Eugene E. Harnish, South Bend, Ind., assignor to The Bendix Corporation, a corporation of Delaware
Filed July 27, 1966, Ser. No. 568,261
7 Claims. (Cl. 152—416)

This invention relates to a tire pressure control system and, more particularly, to a tire inflation-deflation system for aircraft.

Generally, for optimum performance, aircraft tires require a relatively high predetermined pressure for take-off, e.g. 150 p.s.i., and a relatively low predetermined pressure for landing, e.g. 75 p.s.i.

Accordingly, it is an object of this invention to provide an inflation-deflation system for an aircraft wherein the tires thereof can be inflated to a first predetermined relatively high pressure which is suitable for taking off from a given type of terrain, and deflated to a second predetermined relatively low pressure which is suitable for landing on a given type of terrain, or vice versa.

Another object of this invention is to provide a tire inflation-deflation system which is controlled by inlet pressure only, and does not require electrical and/or mechanical control interfaces.

A further object of this invention is to provide a unique relatively simple maintenance free tire inflation-deflation system which does not require rotatable seals.

A still further object of this invention is to provide a tire inflation-deflation system wherein specific wheel rotational orientation is unnecessary.

Another object of this invention is to provide a system of the type described which requires only conventional simple control hardware within the aircraft, namely, a three-way valve, a selector valve, and a relief valve.

The above and other objects and features of this invention will become apparent from the following description of the device taken in connection with the accompanying drawing which forms a part of this disclosure and in which:

FIGURE 1 is a fragmentary sectional view of the upper portion of an aircraft wheel incorporating the invention with the static seal and access valve shown in non-operative positions; and FIGURE 2 is a sectional view of a portion of FIGURE 1 showing the static seal in an operative position.

Generally, my tire inflation-deflation system comprises a false axle having a static seal mounted thereon for expansion within a wheel cavity and an access valve incorporated into the wheel structure. In operation, the application of fluid pressure to the inside of the expansible seal acts to seal the wheel cavity. Check valves in the static seal allow the pressure to equalize within the wheel cavity. The pressure operated access valve acts to build up tire pressure equal to that of the wheel cavity and the input pressure. Tire deflation is accomplished by increasing the inlet pressure to a value which will expand the static seal, build up pressure within the wheel cavity, and open the access valve. A pressure release valve is utilized to reduce the input pressure and consequently the pressure within the wheel cavity and the tire itself to allow a reduction in tire and wheel cavity pressure, the reduction being slow enough to prevent the access valve from closing. Venting the inlet pressure to the atmosphere results in rapid static seal contraction, vents the wheel cavity to the atmosphere and causes the access valve between the wheel cavity and the tire cavity to close.

Referring specifically to the drawing, it will be noted that numeral 10 designates an aircraft wheel formed of two sections 12 and 14 fastened together by a plurality of bolts (not shown). Each wheel section includes a hub portion 16 and rim portion 18, said hub portions being mounted on tapered roller bearing assemblies 20 for permitting rotation of the wheel 10 about a non-rotatable two piece false axle 22. An end plate 24 is suitably connected to the wheel 10 by a plurality of bolts 26 (only one of which is shown) and to the rotatable axle 28 by a threaded connection.

Located within a wheel cavity 30 is an annular static seal assembly 32 suitably mounted on the false axle 22 for expansion within the wheel cavity to prevent leakage at the false axle and wheel hub interface. The seal assembly, which includes a pair of oppositely disposed annular resilient seal rings 34, outer annular retainer 36, and inner annular retainers 38, divides the wheel cavity into a seal chamber 40 and wheel chamber 42. A plurality of inlet check valves 44 (only one of which is shown) and a plurality of exhaust check valves 46 (only one of which is shown) are located in the outer annular retainer 36.

A pressure responsive access valve 50, which is located in the wheel, permits air interchange between the wheel and tire 52 while regulating the minimum tire inflation pressure. The access valve includes a valve seat 54, a stepped diameter valve member 56, and a preloaded spring 58 for urging the valve member against the valve seat. The spring end of the valve member is vented to atmosphere by passage 60. The passage 62 in the valve member permits the pressure in wheel chamber 42 to act not only on the end of the valve member in contact with the valve seat, but also on the large piston area of the stepped diameter valve member.

The desired air pressure is transmitted from a controlled pressure source 64, such as a compressor or air tank, to the seal chamber 40 through an inlet passage 66 located in false axle 22. Interposed between the pressure source and the inlet passage is a conventional three-way valve 68 for communicating the seal chamber 40 with the pressure source or the atmosphere, and a pressure relief and selector valve 70 to prevent overinflation and provide automatic control.

The following symbols are utilized in the functional explanation of the system:

$P_o$=gage pressure at inlet line
$P_a$=atmospheric pressure
$P_t$=tire pressure
$P_w$=wheel chamber pressure
$P_s$=seal (torus) chamber pressure Operation of the system will be as follows:

The inflation sequence is initiated by moving the three-way valve 68 to a position communicating with the pressure source whereby the desired pressure $P_o$ is applied to the inlet line, e.g. 150 p.s.i. The rapid build-up of pressure within seal chamber 40 will cause the seal rings 34 to expand outwardly, as shown in FIGURE 2, thus sealing the wheel and false axle interface. After such outward expansion, fluid flow continues through the inlet check valves 44 into the wheel chamber 42. The valve member 56 of the access valve will remain closed until the pressure in wheel chamber 42 reaches a predetermined value, this value being slightly less than the minimum tire pressure, e.g. 75 p.s.i., at which time the valve member will be caused to move against spring 58 to an open position. Tire inflation will continue thereafter until all pressures, $P_s$, $P_w$ and $P_t$, reach the inlet pressure $P_o$. Subsequent movement of the three-way valve to a position whereby the inlet is vented to the atmosphere $P_a$ causes the pressure in chambers 40 and 42 to decrease rapidly as the pressurized gas flows through the seal ring exhaust check valves 46. When the pressure in chamber 42 becomes less than the access valve operating pressure, spring 58 causes valve member 56 to move to a closed position, so as to maintain the desired tire pressure. The relatively large tire volume compared to that of the wheel chamber 42 precludes significant tire pressure loss prior to closing of the access valve. Furthermore, seal element retraction is assured by the small differential pressure required to open the seal ring exhaust valves.

Tire pressure deflation, that is, reduction of tire pressure to a predetermined value, e.g. 75 p.s.i., is initiated by first moving the three-way valve to the inflate position so as to increase the inlet pressure to a value in excess of the access valve operating pressure. After the seal assembly 32 extends outwardly into sealing engagement and the access valve opens, the tire pressure at 150 p.s.i. will bleed into the wheel chamber 42, into the seal chamber 40 via exhaust check valves 46, and thence to the inlet 66. The pressure relief valve 70 in the inlet line vents all tire pressure in excess of the desired deflation pressure. Thereafter, movement of the three-way valve to the exhaust position will vent the inlet $P_o$ to the atmosphere and will result in closing of the access valve and retraction of the seal element, as described for the exit action during inflation. The several practical advantages which flow from my tire inflation-deflation system are believed to be obvious from the above, and other advantages may suggest themselves to those who are familiar with the art to which this invention relates.

Furthermore, although my invention has been described in connection with a specific embodiment, it will be obvious to those skilled in the art that various changes may be made in the form, structure and arrangement of the components without departing from the spirit of the invention. Accordingly, I do not desire to be limited to the specific embodiment disclosed herein primarily for purposes of illustration, but instead desire protection falling within the scope of the appended claims.

Having thus described the various features of the invention, what I claim as new and desire to secure by Letters Patent is:

1. In an aircraft having a fixed member, a wheel rotatably mounted on said member, said wheel forming a cavity with said member, a tire mounted on said wheel, and a pneumatic pressure source, a tire inflation-deflation system comprising annular static sealing means mounted on said fixed member and located in said cavity for dividing said cavity into a seal chamber formed inside of said sealing means and a wheel chamber formed outside of said sealing, first passage means located in said fixed member for communicating said seal chamber with said pressure source, said sealing means being caused upon pressurization of said seal chamber to expand into sealing engagement with said wheel to thereby seal said wheel chamber and prevent leakage between said fixed member and said wheel, first valve means operatively connected to said sealing means for permitting flow of compressed gas between said chambers, second passage means located in said wheel for communicating said wheel chamber with said tire, and second valve means interposed in said second passage means for permitting flow of compressed gas into and out of said tire.

2. A tire inflation-deflation system, as defined in claim 1, wherein said first valve means includes at least one inlet check valve for permitting flow from said seal chamber to said wheel chamber and at least one exhaust check valve for permitting flow from said wheel chamber to said seal chamber.

3. A tire inflation-deflation system, as defined in claim 2, wherein said second valve means is responsive to the pressure in said wheel chamber and moves from a closed to an open position to permit communication between said wheel chamber and said tire at substantially the predetermined minimum tire pressure.

4. A tire inflation-deflation system, as defined in claim 3, wherein said sealing means is torus-like in shape with two oppositely disposed annular resilient seal rings, one of which seals one side of the wheel chamber and the other of which seals the other side of the wheel chamber.

5. A tire inflation-deflation system, as defined in claim 4, which includes a three-way valve for selectively communicating said seal chamber with said pressure source or the atmosphere.

6. A tire inflation-deflation system, as defined in claim 5, which includes an automatic control valve located between said three-way valve and said seal chamber for preventing the transmission of pressures from said pressure source to said seal chamber in excess of the maximum tire pressure.

7. A tire inflation-deflation system, as defined in claim 6, wherein said fixed member is a false axle.

No references cited.

ARTHUR L. LA POINT, *Primary Examiner.*

C. B. LYON, *Assistant Examiner.*